(12) United States Patent
Hoffmann

(10) Patent No.: US 6,492,638 B2
(45) Date of Patent: Dec. 10, 2002

(54) SCANNING MICROSCOPE AND A CONFOCAL SCANNING MICROSCOPE HAVING A CIRCULATOR

(75) Inventor: Juergen Hoffmann, Wiesbaden (DE)

(73) Assignee: Leica Microsystems Heidelberg GmbH, Mannheim (DE)

( * ) Notice: Subject to any disclaimer, the term of this patent is extended or adjusted under 35 U.S.C. 154(b) by 0 days.

(21) Appl. No.: 09/892,661

(22) Filed: Jun. 28, 2001

(65) Prior Publication Data

US 2002/0020815 A1 Feb. 21, 2002

(30) Foreign Application Priority Data

Jun. 28, 2000 (DE) .......................... 100 31 458

(51) Int. Cl.[7] .............. H01J 3/14; H01J 40/14; H01J 5/16
(52) U.S. Cl. ............. 250/234; 250/216; 359/368; 359/389
(58) Field of Search .................... 250/234, 201.3, 250/201.2, 216, 548; 359/368, 389, 214

(56) References Cited

U.S. PATENT DOCUMENTS

| 5,781,018 A | * | 7/1998 | Davidov et al. ............ 324/637 |
| 5,939,709 A | * | 8/1999 | Ghislain et al. ............ 250/216 |
| 6,351,325 B1 | * | 2/2002 | Mandella et al. ........... 359/210 |

OTHER PUBLICATIONS

"Handbook of Biological Confocal Microscopy", 1990, Plenum Press, by James B. Pawley.

* cited by examiner

Primary Examiner—Stephone B. Allen
Assistant Examiner—Christopher W. Glass
(74) Attorney, Agent, or Firm—Crowell & Moring LLP

(57) ABSTRACT

A scanning microscope (100) possesses at least one illumination source (4), an objective (10), and at least one detector (12). An optical circulator (14) is arranged between the at least one illumination source (4), the objective (10), and the at least one detector (12). In a further embodiment, the scanning microscope (100) is configured as a confocal scanning microscope.

11 Claims, 4 Drawing Sheets

SCANNING MICROSCOPE AND A CONFOCAL SCANNING MICROSCOPE HAVING A CIRCULATOR

CROSS REFERENCE TO RELATED APPLICATIONS

This invention claims priority of a German patent application DE 100 31 458.9-42 which is incorporated by reference herein.

FIELD OF THE INVENTION

The invention concerns a scanning microscope having a circulator. Furthermore the invention concerns a confocal scanning microscope with a circulator.

BACKGROUND OF THE INVENTION

In scanning microscopy, a specimen is illuminated with a light beam in order to observe the reflected light or fluorescent light emitted from the specimen. The focus of the illuminating light beam is generally moved in a specimen plane by tilting two mirrors, the deflection axes usually being perpendicular to one another so that one mirror moves in the X direction and the other in the Y direction. Tilting of the mirrors is brought about, for example, using galvanometer positioning elements; both fast, resonant galvanometers and slower (and more accurate) nonresonant galvanometers are used. The output level of the light coming from the specimen is measured as a function of the position of the scanning beam.

The general construction of a scanning microscope is disclosed in the textbook by James B. Pawley "Handbook of Biological Confocal Microscopy," 1990, Plenum press, New York. The principle of confocal microscopy is described, for example, on pages 4 through 7 (see FIG. 2 in Pawley). In this context, a specimen is scanned using a precisely focused light beam. The light proceeding from the specimen passes through a beam splitter to a detector, in front of which an entrance pinhole is positioned.

In confocal scanning microscopy in particular, a specimen is scanned in three dimensions with the focal point of a light beam. A confocal scanning microscope generally comprises a light source, a focusing optical system with which the light of the source is focused onto a stop (called the "excitation stop"), a beam splitter, a scanning apparatus for controlling the beam, a microscope optical system, a detection stop, and the detectors for detecting the detected light or fluorescent light. The illuminating light is coupled in via a main beam splitter. The fluorescent light or reflected light coming from the specimen arrives via the same scanning mirror back at the main beam splitter, and passes through the latter and is then focused onto the detection stop, behind which the detectors (usually photomultipliers) are located. Detected light that does not derive directly from the focus region takes a different light path and does not pass through the detection stop, thus yielding a point datum that results, by sequential scanning of the specimen, in a three-dimensional image. A three-dimensional image is usually achieved by recording image data in layers.

Since the wavelengths of the exciting light and detected light differ because of the Stokes shift, dichroic main beam splitters are usually used to observe the fluorescent light. They are designed in such a way that the detected light can pass without hindrance, whereas the illuminating light is deflected at a right angle. No substantial losses occur with this arrangement.

Dichroic beam splitters cannot be used when a specimen (for example one prepared with several dyes) is simultaneously illuminated with light of several wavelengths, and/or when the detected light is polychromatic. Dichroics are not suitable in particular in reflection microscopy, in which the exciting light and detected light have the same wavelength. Broadband beam splitters are used in these situations.

The problems associated with the use of beam splitters in scanning microscopy will now be explained. When the beam splitters used are not polarization beam splitters or chromatic beam splitters, considerable losses of exciting light and/or detected light occur. If a 50:50 beam splitter is used, only 50% of the exciting light arrives at the specimen. Even assuming total reflection at the specimen, of that amount only 50% (i.e. 25% of the illuminating light output) reaches the detector. The detected light loss can be reduced to 10% by using a 90:10 beam splitter, but this entails a loss of 90% of the exciting light. This solution is therefore practical only if sufficient exciting light output is available. There are certain light sources, however, for example blue laser diodes, whose light output is very limited.

SUMMARY OF THE INVENTION

It is the object of the invention to eliminate losses of exciting light and/or detected light at the main beam splitter in scanning microscopy. A further object of the invention is for as much as possible of the light generated by the light source to be directed onto the specimen and received by the specimen, in order to limit the light output of the illumination source.

According to the present invention, the object is achieved by a scanning microscope which comprises: at least one illumination source, an objective, at least one detector, and an optical circulator being arranged between the at least one illumination source, the objective, and the at least one detector.

It is a further object of the invention to eliminate losses of exciting light and/or detected light at the main beam splitter in a confocal scanning microscope.

According to the present invention, the object is achieved by a confocal scanning microscope which comprises at least one illumination source, an objective, at least one detector, an optical circulator being arranged between the at least one illumination source, the objective, and the at least one detector, and a detection stop that is arranged in front of the at least one detector.

An advantage of the invention is that the beam splitter is replaced by a circulator. Circulators have been known for some time from microwave technology. Optical circulators are usually magnetooptical components which operate on the basis of the Faraday effect or the Cotton-Mouton effect. One example of a component that is related in principle is the optical isolator, which allows light to pass through in only one direction. Circulators, on the other hand, have not just two but three or more inputs, linked together in circular fashion. In the case of a circulator having inputs 1, 2, and 3, light that is coupled into, for example, input 1 comes back out of input 2. Light that is coupled into input 2 leaves the circulator through input 3.

If, in a microscope arrangement, the illumination light source is then associated with input 1, the specimen with input 2, and the detector with input 3, the circulator then performs the task of the main beam splitter completely and in almost lossless fashion (apart from minor insertion damping).

The reflectivity or transmissivity of beam splitters is generally polarization dependent. Even high-quality beam splitters cannot be completely optimized, so that differences always occur in reflection and transmission behavior in terms of S and P polarization. If the linear polarization direction of the illuminating light fluctuates, which often happens especially when the light is coupled in with a glass fiber, fluctuations in the illuminating light at the specimen then occur.

Presently available circulators operate independently of polarization, so that these problems do not occur. The data sheets of presently available circulators expressly demonstrate polarization independence.

In particular, fiber-optic circulators can be used. As a particular embodiment, the fiber end at the output associated with the specimen could serve as both the illumination stop and the detection stop. Spectrally broadband circulators are preferably used.

BRIEF DESCRIPTION OF THE DRAWINGS

The subject matter of the invention is depicted schematically in the drawings and will be described below with reference to the Figures, in which.

DETAILED DESCRIPTION OF THE INVENTION

Figure 1:
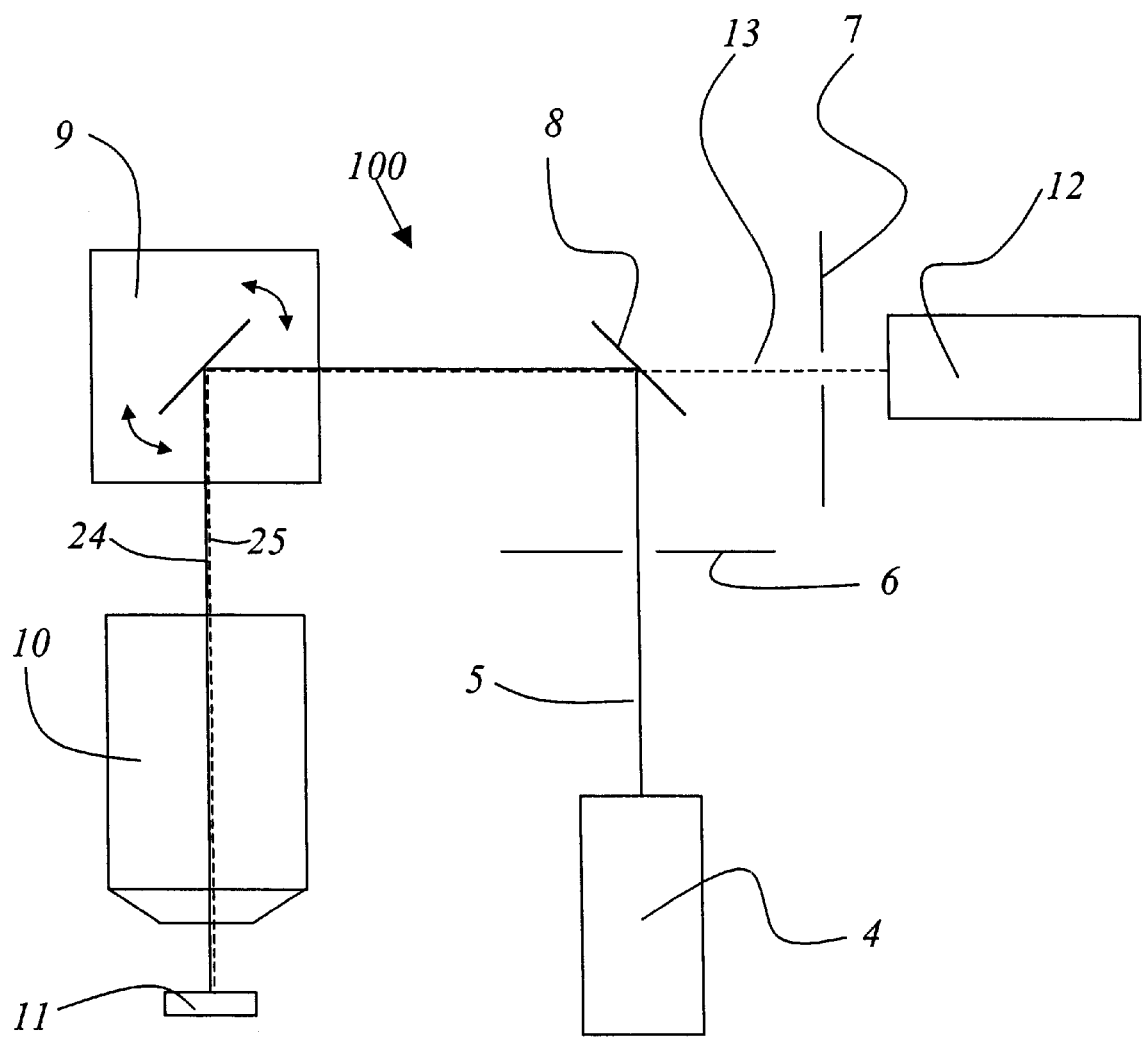
FIG. 1 shows a confocal scanning microscope having a beam splitter, corresponding to the existing art.

FIG. 1 shows a scanning microscope 100 of the existing art. The configuration of a scanning microscope 100 substantially comprises a light source 4 that generates an illuminating light beam 5. Through an illumination stop 6, illuminating light beam 5 arrives at a main beam splitter 8. From main beam splitter 8, the light of light source 4 arrives at a scanner 9. Scanner 9 is configured in such a way that with it, a specimen 11 being examined can be scanned in a desired manner by a scanning light beam 24. Scanning light beam 24 passes via an objective 10 to specimen 11 being examined. In the same fashion, a detected light beam 13 returned from specimen 11 is imaged by objective 10 onto scanner 9. Proceeding from scanner 9, detected light beam 13 passes through main beam splitter 8. A detection stop 7 is provided in front of a detector 12 that is arranged after main beam splitter 8 in detected light beam 13. The problems and disadvantages of the use of a main beam splitter 8 need not be discussed further at this juncture, since this has already been done in the introduction.

Figure 2:
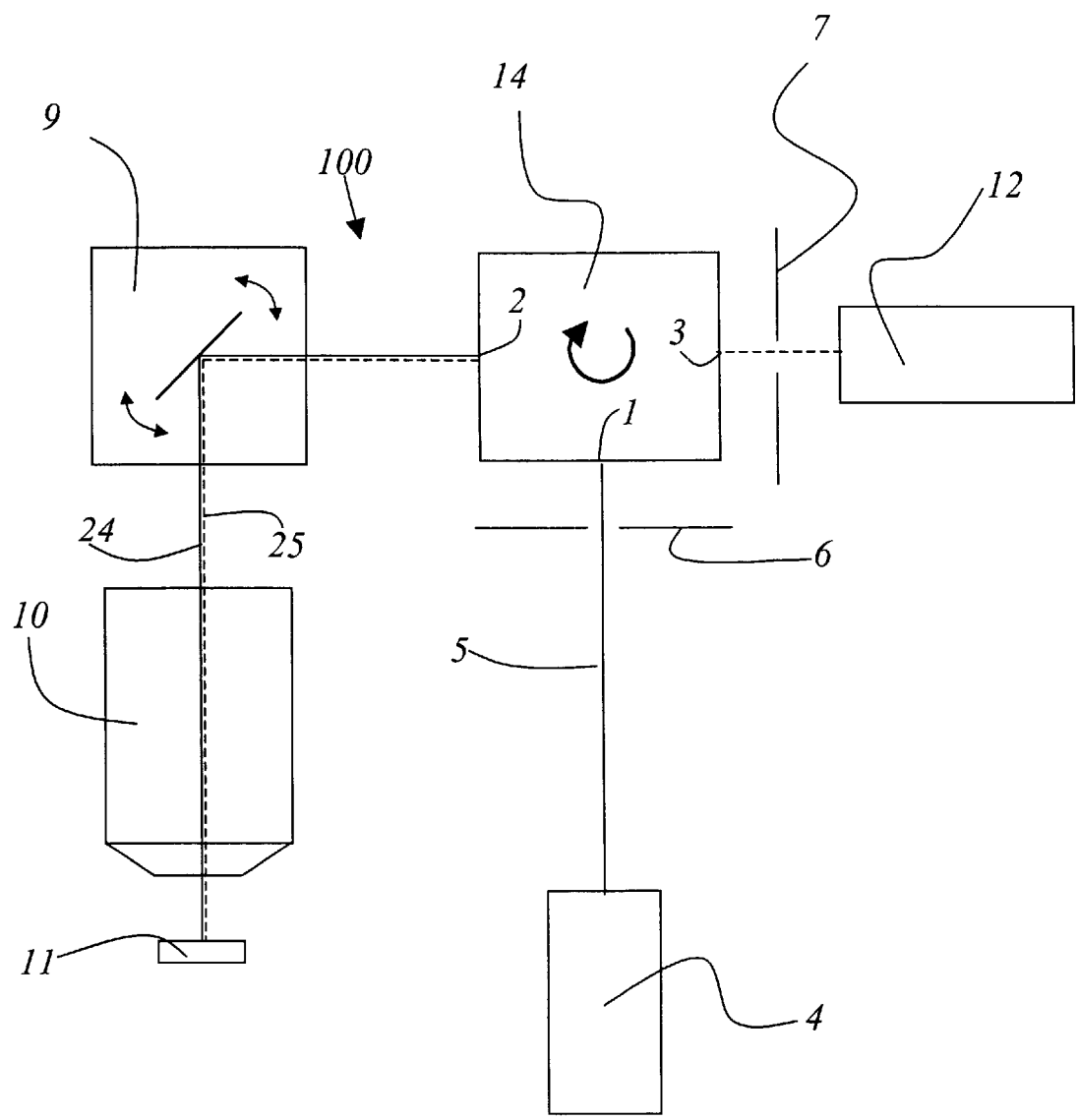
FIG. 2 shows a scanning microscope having an optical circulator.

In the description below, identical reference characters are used for identical elements. FIG. 2 shows a scanning microscope 100 that uses an optical circulator 14 instead of a main beam splitter. In the exemplary embodiment depicted here, optical circulator 14 possesses an input 1, an output/input 2, and an output 3. Light source 4 generates illuminating light beam 5, which is directed onto input 1 of optical circulator 14. Illuminating light beam 5 is brought to the desired diameter by an illumination stop 6. The light of illuminating light beam 5 then emerges from optical circulator 14 through output/input 2. The light emerging from output/input 2 defines a scanning light beam 24. Scanning light beam 24 strikes scanner 9 and from there passes through objective 10 to specimen 11. The light reflected from specimen 11 defines a detected light beam 25 that passes from specimen 11 through objective 10 and the scanner to output/input 2 of optical circulator 14. The light is directed by optical circulator 14 to output 3, from which it emerges and passes to a detector 12. A detection stop 7 is arranged in front of detector 12. The function of detection stop 7 as a pinhole in scanning microscopy is sufficiently familiar to those skilled in the art.

Figure 3:
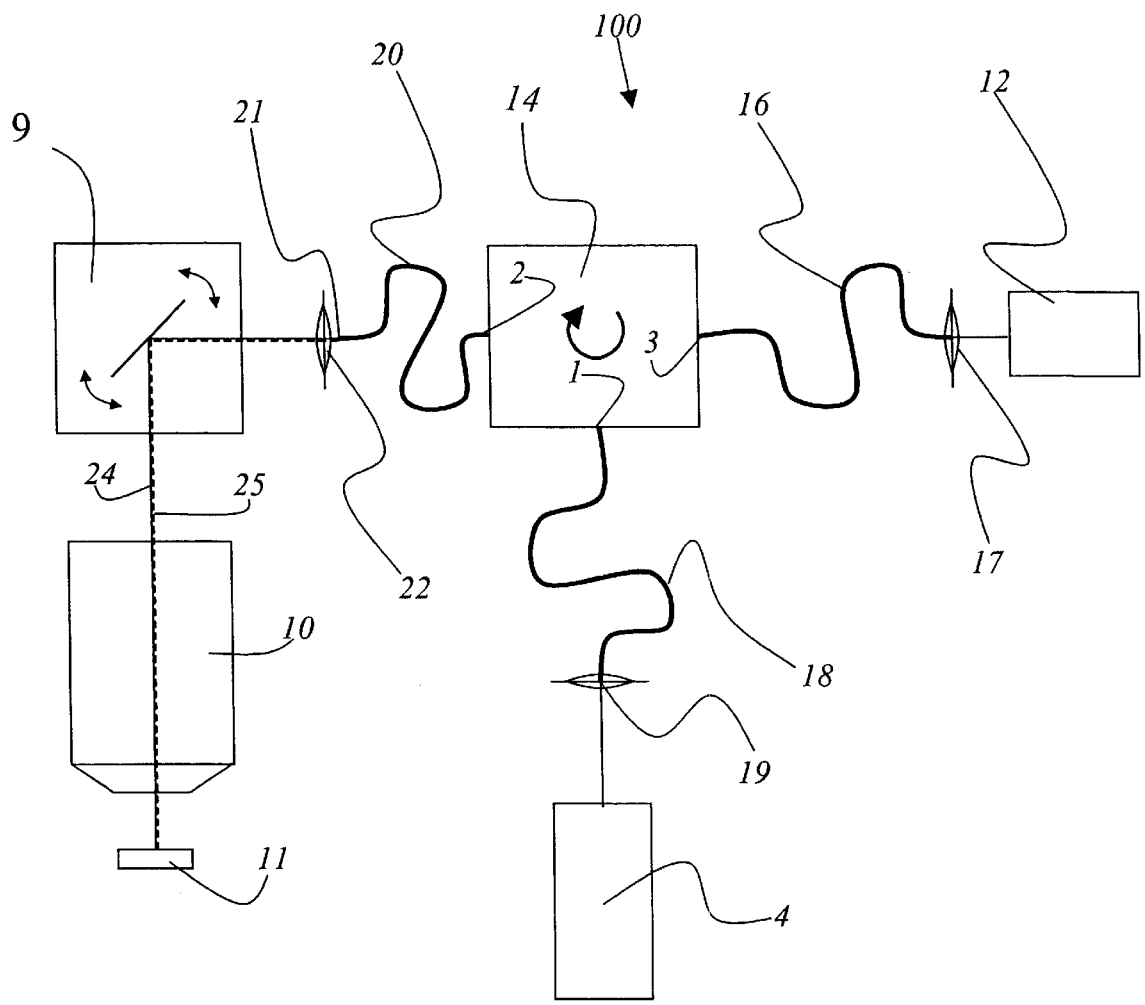
FIG. 3 shows a scanning microscope having a fiber-optic circulator, in which the fiber end facing toward the specimen serves simultaneously as the illumination stop and detection stop.

FIG. 3 shows optical circulator 14 in another embodiment. Input 1, output/input 2, and output 3 are respectively connected to a light-guiding optical fiber 16, 18, and 20. Optical fiber 18 connected to first input 1 of circulator 14 possesses a fiber coupling optical system 19 at the end away from input 1. Optical fiber 20 connected to output/input 2 of circulator 14 possesses a fiber coupling optical system 22 at the end away from output/input 2. Optical fiber 16 connected to output 3 of circulator 14 possesses a fiber coupling optical system 17 at the end away from output 3. The light path is comparable to that of FIG. 2. The only difference is that the light from light source 4 is coupled via fiber coupling optical system 19 directly into optical fiber 18. The light at second input 2 of optical circulator 14 is similarly coupled into and out of optical fiber 20 through fiber coupling optical system 22. In similar fashion, at output 3 of the optical circulator the light from optical fiber 16 is directed through fiber coupling optical system 17 directly onto detector 12. In the exemplary embodiment presented here, optical fiber 20 connected to output/input 2 of the optical circulator defines a fiber end 21 whose diameter is to be regarded simultaneously as the illumination stop and the detection stop.

Figure 4:
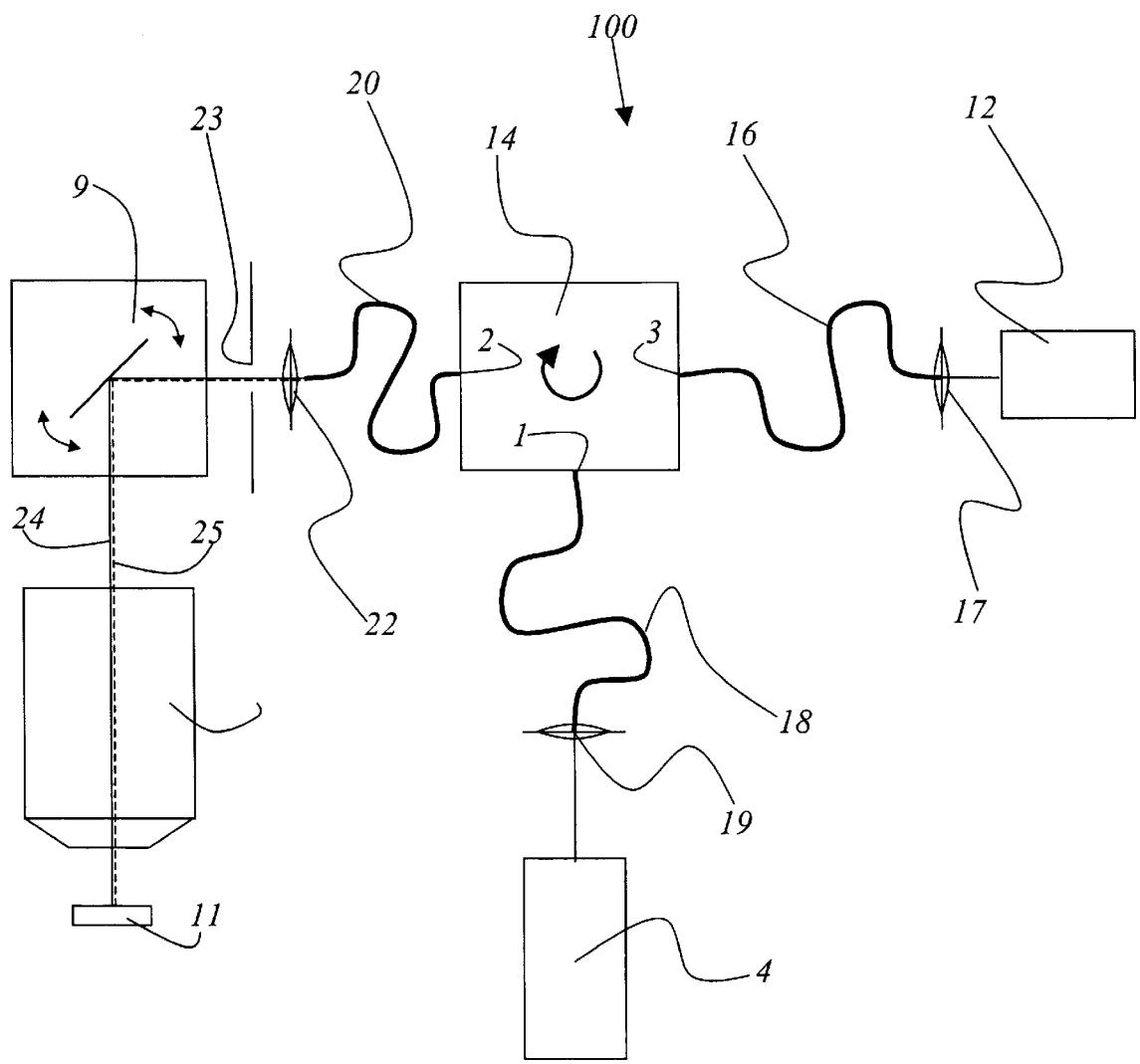
FIG. 4 shows a scanning microscope having a fiber-optic circulator, in which a stop serving as the illumination stop and detection stop is positioned between the circulator and scanner.

FIG. 4 depicts a further exemplary embodiment of a scanning microscope having an optical circulator 14. It differs from the exemplary embodiment depicted in FIG. 3 in that an illumination and detection stop 23 is provided in the beam path of scanning light beam 24 and detected light beam 25. Illumination and detection stop 23 is arranged between fiber coupling optical system 22 for optical fiber 20 connected to output/input 2 of optical circulator 14, and scanner 9. None of the other essential elements of a scanning microscope need to be mentioned further here, since they are sufficiently known from FIGS. 2 and 3.

The present invention was described with reference to a particular exemplary embodiment. It is nevertheless apparent that changes and modifications can be made without thereby leaving the range of protection of the claims recited hereinafter.

PARTS LIST

1 Input of circulator
2 Output/input of circulator
3 Output of circulator
4 Light source
5 Illuminating light beam
6 Illumination stop
7 Detection stop
8 Main beam splitter
9 Scanner
10 Objective
11 Specimen
12 Detector 13 Detected light beam
14 Optical circulator
16 Fiber at output
17 Fiber coupling optical system
18 Optical fiber at input
19 Fiber coupling optical system
20 Optical fiber at output/input
21 Fiber end (illumination and detection stop)
22 Fiber coupling optical system
23 Illumination and detection stop
24 Scanning light beam
25 Detected light beam
100 Scanning microscope

What is claimed is:

1. A scanning microscope comprising: at least one illumination source, an objective, at least one detector, and an optical circulator being arranged between the at least one illumination source, the objective, and the at least one detector.

2. The scanning microscope as defined in claim 1, wherein the optical circulator conveys light from the illumination source to the objective with which a specimen being examined is associated, and delivers light proceeding from the specimen to the detector.

3. The scanning microscope as defined in claim 2, wherein the optical circulator has at least one input for the at least one illumination source, an output and input associated with the objective, and a respective output associated with the at least one detector.

4. The scanning microscope as defined in claim 3, wherein the circulator internally spectrally separates the light proceeding from the specimen, and conveys the respective separated spectral component to the corresponding detector.

5. The scanning microscope as defined in claim 3, wherein an optical fiber is associated with each of the outputs and inputs of the optical circulator.

6. A confocal scanning microscope comprising: at least one illumination source, an objective, at least one detector, an optical circulator being arranged between the at least one illumination source, the objective, and the at least one detector, and a detection stop that being arranged in front of the at least one detector.

7. The confocal scanning microscope as defined in claim 6, wherein the optical circulator conveys light from the illumination source to the objective with which a specimen being examined is associated, and delivers light proceeding from the specimen to the detector.

8. The confocal scanning microscope as defined in claim 7, wherein the optical circulator has at least one input for the at least one illumination source, an output and input associated with the objective, and a respective output associated with the at least one detector.

9. The confocal scanning microscope as defined in claim 8, wherein the optical circulator internally spectrally separates the light proceeding from the specimen, and conveys the respective separated spectral component to the corresponding detector.

10. The confocal scanning microscope as defined in claim 8, wherein an optical fiber is associated with each of the outputs and inputs of the optical circulator.

11. The confocal scanning microscope as defined in claim 10, characterized in that the detection stop is constituted by one end, associated with the objective, of an optical fiber.

* * * * *